United States Patent

[11] 3,617,593

| [72] | Inventor | Sterling W. Alderfer<br>Akron, Ohio |
|---|---|---|
| [21] | Appl. No. | 736,891 |
| [22] | Filed | May 1, 1968 |
| [23] | | Division of Ser. No. 606,970, Jan. 3, 1967,<br>Pat. No. 3,397,639 |
| [45] | Patented | Nov. 2, 1971 |
| [73] | Assignee | Teledyne, Inc.<br>Los Angeles, Calif. |

[54] METHOD FOR MAKING REINFORCED IGNITION-
TUBE OF REINFORCED POLYURETHANE FOAM
3 Claims, 6 Drawing Figs.

[52] U.S. Cl. ............................................... 264/45,
102/70, 264/257
[51] Int. Cl. ............................................. B29d 27/04
[50] Field of Search ............................................ 264/45,
257; 102/27, 70

[56] References Cited
UNITED STATES PATENTS

| 3,048,169 | 8/1962 | Pierce | 264/45 X |
| 3,087,201 | 4/1963 | Williams | 264/257 |
| 3,273,179 | 9/1966 | Ridenour | 264/45 X |
| 3,311,056 | 3/1967 | Noddin | 102/27 |
| 3,440,307 | 4/1969 | Printz | 264/45 |

Primary Examiner—Donald J. Arnold
Assistant Examiner—Paul A. Leipold
Attorney—Hamilton, Cook, Renner & Kenner ABSTRACT: A method of making a reinforce foam polyurethane ignition tube by selecting a length of woven polyester sleeve which exceeds the length of the mold cavity said sleeve having a weave pattern which causes the sleeve to expand radially upon axial compression and to contract radially upon axial elongation, inserting the sleeve into a cylindrical mold cavity, axially compressing the sleeve into conformity with the outer forming surface of the mold cavity, charging the cavity with foamable polyurethane and allowing the polyurethane to foam and unite with the sleeve. The sleeve lies contiguous with the outer surface of the tube and serves to reinforce the tube.

PATENTED NOV 2 1971 3,617,593
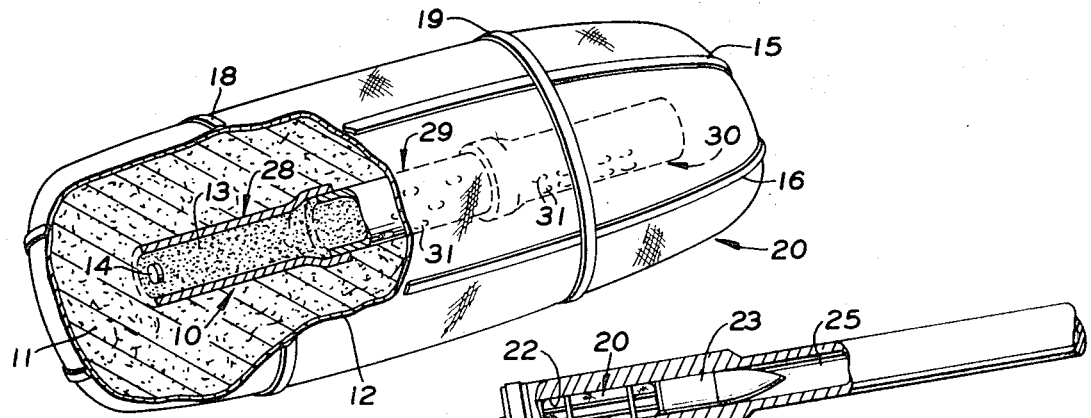
FIG. 1
FIG. 2
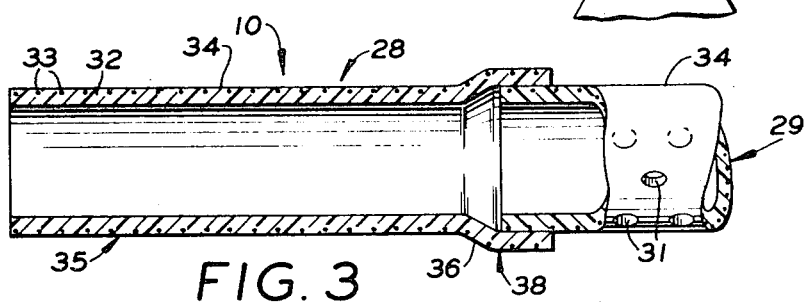
FIG. 3
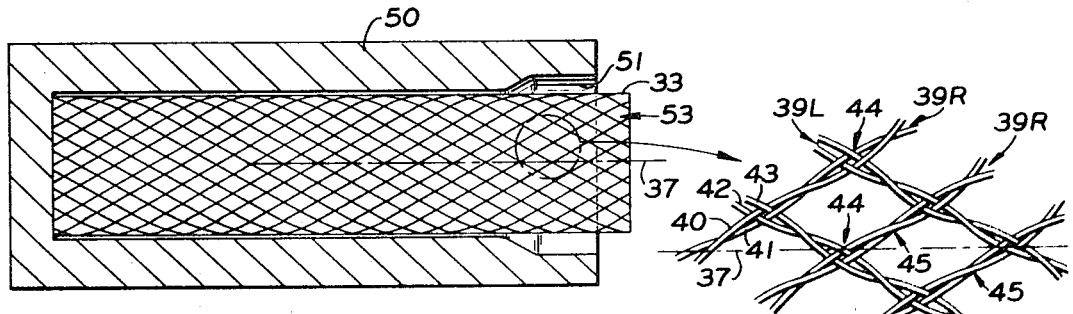
FIG. 5
FIG. 4
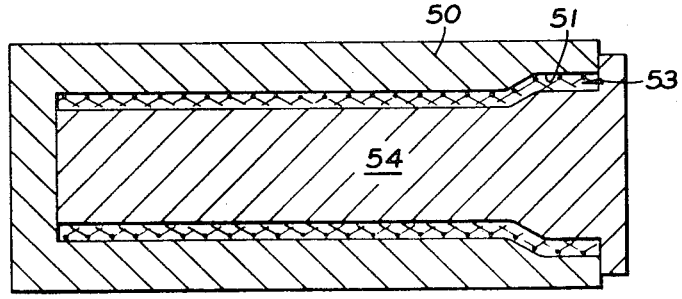
FIG. 6
INVENTOR.
STERLING W. ALDERFER
BY Hamilton, Cook,
Renner & Kenner
ATTORNEYS

3,617,593

METHOD FOR MAKING REINFORCED IGNITION-TUBE OF REINFORCED POLYURETHANE FOAM

RELATED APPLICATIONS

This application is a divisional application of my prior copending application, Ser. No. 606,970, filed Jan. 3, 1967 now U.S. Pat. No. 3,397,639.

BACKGROUND OF THE INVENTION

As is being poignantly demonstrated during the armed conflicts in various spots around the world, it is too costly, inconvenient and in many situations highly undesirable for field artillery to use cartridgelike ammunition. A cartridge has the primer, propellant and projectile all contained within a shell. Shells are usually made from a high-grade brass so that it has sufficient malleability to withstand the severe mechanical deformation incident to the shaping of the shell. Not only is the brass itself expensive but so is the cost of fabricating the shell therefrom. Moreover, after the cartridge has been fired the empty shell remains.

This nonexpendability of the shell has been found to be most undesirable, particularly for mobile artillery units. The fired shell is excess baggage for the artillery crew, and yet, if it is discarded, it leaves a permanent cairn by which movements of the artillery crew can be tracked. Accordingly, the practice has been adopted to substitute dual components—i.e., a cartridge sack and a separate projectile—for the unitary cartridges previously used with small- and medium-sized mobile artillery pieces.

The cartridge sack is a bag filled with propellant; and ignition tube being buried in the propellant. The ignition tube holds a powder ignition charge and primer which, in turn, ignite the propellant. Although it is permissible for the powder charge to ignite rather rapidly upon explosion of the primer, the direction in which, and the rate at which, the propellant burns is quite critical. Accordingly, the ignition tube is carefully perforated and specifically located within the cartridge sack so that the propellant is ignited to burn generally from the front to the rear.

Coupled with the requirement for controlled ignition, the cartridge sack must be completely consumed within the barrel of the artillery piece. If any residue in the form of a hard ash remains on the interior of the barrel it can jam the insertion of the subsequent projectile.

An ignition tube made from rigid polyurethane foam has been found capable of controlling the ignition of the propellant and is consumed upon ignition. However, such tubes have been too frangible to permit any rough handling of the cartridge sack. For example, when the cartridge sacks are parachuted to the artillery teams, the ignition tubes have broken on landing. The danger can be insidious in that the ignition of the propellant by a broken tube may be improper only to the degree that the range of the projectile is erratic, or, more unfortunately, the broken tube can cause the propellant to explode, rather than ignite, and thereby blow the breach or cause permanent damage to the barrel.

Many attempts have been made to reinforce the polyurethane ignition tubes, but none have been satisfactory. With the straight tube segments experimentation discloses that the reinforcement is effective only when it lies contiguously to the radially outer wall. To adapt this teaching to a belled tube has not, however, heretofore been practical.

SUMMARY OF THE INVENTION

It is therefore an object of the present invention to provide an ignition tube for a cartridge sack which incorporates a reinforcement adjacent the radially outer surface thereof, irrespective of whether or not the tube is straight or belled.

It is another object of the present invention to provide a reinforced ignition tube, as above, which leaves no residual deposits of hard ash on the interior of the barrel.

It is a further object of the present invention to provide an ignition tube, as above, which will afford controlled ignition of the propellant even after the cartridge sack has been roughly handled.

These and other objects of the present invention, as well as the advantages thereof over existing and prior art forms, will be apparent in view of the following detailed description of the attached drawings and are accomplished by means hereinafter described and claimed.

In general, an ignition tube embodying the concept of the present invention is formed from one or more sections of a hollow, generally tubular rigid foam. A reinforcing sleeve is encases within the foam in juxtaposition with the radially outer surface of the tube, even when the radially outer surface of the tube is of progressively varied diameter.

The sleeve itself is preferably woven from polyester strands of two filaments each. The strands are oriented helically of both right- and left-hand lay; the strands of opposite lay being interwoven so that the diameter of the sleeve increases or decreases, respectively, upon axial compression or elongation of the sleeve.

The increase in diametric dimension upon axial compression allows the sleeve to conform most closely to the outer surface of even a belled tube by simply compressing the sleeve within the cavity of the mold which forms the tube before the foam hardens in the mold.

One preferred embodiment of the subject ignition tube, together with the method by which such a tube is made, are shown by way of example in the accompanying drawings and are described in detail without attempting to show all of the various forms and modifications in which the invention might be embodied; the invention being measured by the appended claims and not by the details of the specification.

DESCRIPTION OF THE DRAWINGS

FIG. 1 is a perspective view, partially cut away, of a cartridge sack incorporating an ignition tube embodying the concept of the present invention;

FIG. 2 is a schematic side elevation, partly in section, of an artillery piece with the cartridge sack of FIG. 1 received in the chamber thereof;

FIG. 3 is an enlarged side elevation partly in section, of a belled tube segment and a portion of a cylindrical segment;

FIG. 4 is a further enlarged side elevation of a reinforcing sleeve depicting the weave thereof in greater detail;

FIG. 5 is a longitudinal section of a mold adapted for making a belled ignition tube segment with a cylindrical section of reinforcing sleeve received therein; and FIG. 6 is a view similar to FIG. 5 depicting the sleeve in juxtaposition to the wall of the mold cavity and with the core positioned therein.

DESCRIPTION OF THE PREFERRED EMBODIMENT

Referring more particularly to the drawings, an ignition tube embodying the concept of the present invention is indicated generally by the numeral 10. As is shown in the FIG. 1 representation, the ignition tube 10 is buried in the propellant charge 11 contained within a cloth bag 12. Interiorly of the ignition 10 is the ignition charge 13 which is fired by the primer 14.

The arrangement of the primer 14, ignition charge 13, ignition tube 10 and propellant charge 11 are contained within the cloth bag 12 which is itself secured in a generally cylindrical shape by longitudinal bindings 15 and 16 and the spaced, circumferential bindings 18 and 19. This entire combination is the cartridge sack 20.

The cartridge sack 20 is a self-contained unit which may be stored and transported independently of the projectile until it is received within the chamber of the artillery piece. As shown in the schematic representation of the mobile artillery piece '21 in FIG. 2, the cartridge sack 20 is positioned within the chamber 22 immediately behind the projectile 23. In order to prevent blowing of the breach 24 the propellant charge must burn at a controlled rate so that the resulting gases can overcome the static inertia of the projectile 23 and start it moving forwardly through the barrel 25 without building up excessive chamber pressures. This controlled burning rate is also critical to the accuracy of the artillery piece 21. As such it has been found highly desirable to construct the ignition tube 10 from three segments: a rearmost, belled and imperforate segment 28; a middle, cylindrical, perforated segment 29 and a forward, belled, perforate segment 30.

The position and number of the perforations 31 through the walls of the middle and forward segments 29 and 30, respectively, have been carefully worked out, in conjunction with the construction and characteristics of the particular propellant used, so that the controlled ignition, or burning, thereof is accomplished. These details do not form a part of the present invention and will, therefore, not be further describe.

Reference is made to the criticality of controlled ignition only so it will become manifestly apparent that the integrity of the ignition tube 10 must be maintained irrespective of whether the cartridge sack 20 is gently or roughly handled. The quest for a satisfactory way by which to reinforce ignition tubes so that they are capable of withstanding air-drops has been fruitless prior the subject invention.

Referring to FIG. 3, it can be seen that the rigid foam 32 forms the substance or body, of the tube and is reinforced by a sleeve 33 encased within the foam but positioned in juxtaposition to the outer surface 34 thereof. It should be noted that even though the rearmost and forward segments 28 and 30, respectively, have a cylindrical portion 35 which flares radially outwardly through a transitional shoulder 36 of progressively increasing diameter to a bell portion 38 of greater diameter than the cylindrical portion 35, the sleeve 33 is adjacent the entire radially outer surface 34 of both tube segments.

The foam 32 found most suitable for use in ignition tubes is rigid polyurethane. Rigid urethane foams may be readily produced by either of two methods—the quasi-prepolymer or the "one shot" method.

In the quasi-prepolymer method the diisocyanate is reacted with a portion of the polyester to give a NCO-terminated prepolymer. In the foaming step the prepolymer is reacted with the rest of the polyester, catalyst, surfactant and fluorocarbon.

The "one shot" process is more economical in that no prereaction step is required. This process requires, simply, that at least two conduits lead to the mixing head since all the components can be premixed except for the diisocyanate. One apparatus particularly adapted for the charging of molds according to the "one shot" process can be found in my U.S. Pat. No. 3,264,067.

Properly to reinforce the tube, it has been found that a nonpuckering sleeve 33 should be incorporated. Moreover, the sleeve should be of a loose weave—i.e., an open weave with interstices between parallel strands. An open weave is more suitable for the provision of the perforations 31 without the necessity of severing the strands 39.

An open weave is also eminently suitable for the sleeve 33 because such a weave provides a very high adhesion strength between the sleeve 33 and the rigid foam 32. Inasmuch as the foam penetrates the interstices between the strands while it is foaming, the sleeve is encased in an homogenous mass of rigid foam.

At least for some sizes of ignition tube the mechanical bonding of the foam through the interstices of the sleeve 33 is sufficient to reinforce the tube. However, should additional bonding be required, the material form which the strands are made may itself be roughened to provide an additional mechanical bonding between the foam and the sleeve. Additionally, when little or no chemical bonding obtains between the strand material and the foam, it may be desirable, for some applications, to treat the sleeve with a cement to create a bond between the strand material and the foam.

A weave which conforms well even to a belled tube, such as the segments 28 and 30, without puckering is shown in greater detail in FIG. 4. Strands 39R are helically disposed with respect to the longitudinal axis 37 of the sleeve 33 and are of right-hand lay as viewed in FIG. 4. The strands 39R are intertwined with strands 39L, also helically disposed, of left-hand lay. The strands 39R are each formed from two filaments 40 and 41, and the strands 39L are each formed from two filaments 42 and 43.

The two filaments in each strand 39R and 39L intersect each other in a plain weave—e.g., filament 40 in strand 39R passes over filament 42 and under filament 43 in strand 39L while filament 41 in strand 39R passes under filament 42 and over filament 43 of strand 39L. The aforesaid intertwining of each strand 39R and 39L forms an intersection 44.

Between consecutive intersections the two filaments in the strands of each lay are themselves crossed, as at changeover points 45.

Such a weave is quite stable and yet will conform exactly to the contour of the outer surface 34, even when of progressively varied diameter, without puckering. Nonpuckering results because a sleeve so woven will expand radially upon axial compression and radially contract upon axial elongation.

Because it is imperative that the cartridge sack and its contents be consumed in firing, the material from which the sleeve is woven must not leave a hard ash or other residue which could impair the insertion of the subsequent projectile.

Filaments 40–43, inclusive, of linear, high polymer polyesters have been found to leave no undesirable residue on firing. Polyester is the name given to the material produced by a process involving the esterification condensation of dihydric alcohols and dicarboxylic acids.

This reaction covers a broad range of materials but it is sufficient to note that the linear, high polymer polyester ethylene glycol terephthalate, commonly known as Dacron, works exceedingly well.

The unique suitability of using a sleeve woven as shown and described in conjunction with FIG. 4 can be particularly appreciated when the method by which the ignition tubes are made is known. As shown in FIG. 5, a mold 50 is provided with a belled cavity 51 having the shape desired for the radially outer surface of the ignition tube body, or, if the ignition tube is segmented, a belled segment body.

A section 53 of woven sleeving having a diameter less than the smallest diameter of the cavity 51 so that it is readily insertable therein is woven to, or cut to, a length greater than the axial extent of the cavity. Such a section 53 is depicted inserted in cavity 51 in FIG. 5. With the section 53 thus inserted it is axially compressed within the cavity until the section 53 has expended sufficiently to adapt to and lie contiguously with the surface of the cavity. With very little experimentation a worker is able to select a section length which will exactly equal the axial extent of the cavity after it has been expanded to conform to the surfaces thereof.

As shown in FIG. 6, the insertion of a core 54 into the mold cavity may itself provide the compression of the section 53 as well as define the interior of the tube to be formed in the mold. With the sleeve section 53 thus expanded within the mold, the foaming of the foam-forming components charged into the mold creates the body of the ignition tube with the reinforcing sleeve encased in juxtaposition with the outer surface thereof.

It should therefore be apparent that the objects of the invention have been accomplished.

What is claimed is:

1. A method for making a reinforced, foam polyurethane ignition tube using a mold having a cavity with a radially outer surface to form the outer surface of the desired tube, the axial extent of the cavity defining the length of the tube, and using a core removably receivable in said cavity in spaced relation from said mold, the core forming the inner surface of the desired tube, said method comprising the steps of, selecting a weave pattern that causes the sleeve to expand radially upon axial compression and to contract radially upon axial elongation, weaving a section of reinforcing sleeve from polyester filaments to a diameter less than the diameter of said cavity, selecting a section of the sleeve having a length that exceeds the axial extent of said cavity by a predetermined amount, inserting the sleeve section into the cavity, inserting the core in the cavity, axially compressing the sleeve section radially to expand the sleeve into conformity with a selected forming surface, charging the cavity with foam polyurethane-forming components, and causing said components to foam and form a wall of desired thickness on the radially outer surface of said cavity to encase the sleeve in juxtaposition with a selected surface of said tube.

2. A method for making a reinforced ignition tube, as set forth in claim 9, in which the axial compression of the sleeve radially expands the sleeve until it adapts to and lies contiguous with the radially outer surface of the cavity so that the sleeve will be encased within the tube in juxtaposition with the outer surface of the tube.

3. A method for making a reinforced ignition tube, as set forth in claim 9, in which the weaving step comprises forming strands of two filaments, arranging the strands in helical orientations of intersecting right- and left-hand lays, intertwining the two filaments in each strand of left-hand lay in a plain weave with the intersecting strands of right-hand lay, crossing the two filaments in the strands of each lay between their intersections with the strands of opposite lay.